UNITED STATES PATENT OFFICE.

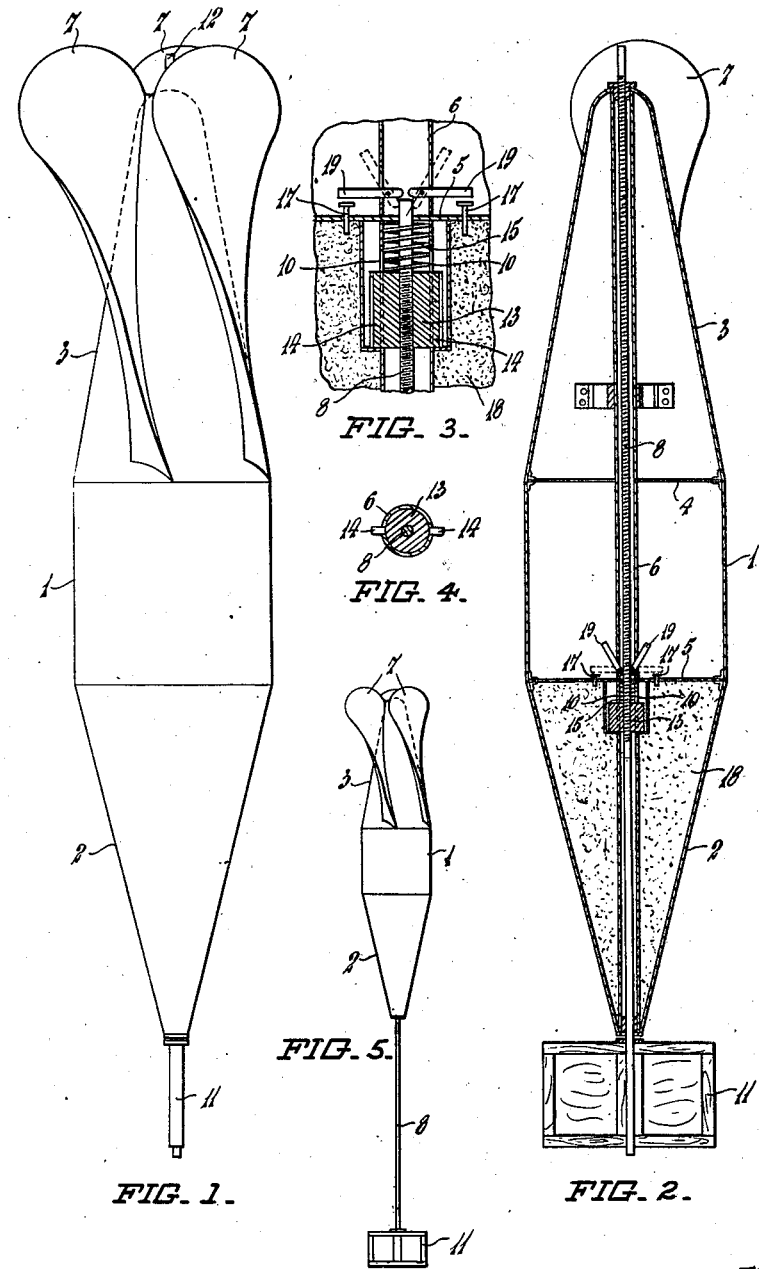

DARCY ALBERT HAWKEN, OF AWAKINO POINT, AUCKLAND, NEW ZEALAND.

BOMB FOR FLYING-MACHINES.

1,306,664.  Specification of Letters Patent.  Patented June 10, 1919.

Application filed December 22, 1917. Serial No. 208,429.

*To all whom it may concern:*

Be it known that I, DARCY ALBERT HAWKEN, a citizen of the Dominion of New Zealand, and residing at Awakino Point, Auckland, in the Provincial District of Auckland, in the Dominion of New Zealand, have invented certain new and useful Improvements in Bombs for Flying-Machines, of which the following is a specification.

This invention relates to improvements in bombs of flying machines, and the object of the invention is to provide a construction with improved means for exploding the bomb immediately prior to the main part thereof coming into contact with the ground or other solid object.

The object is attained by the mechanism illustrated in the accompanying drawing, in which:—

Figure 1, is a plan, and

Fig. 2, a section plan of the bomb,

Fig. 3, is a sectional plan on a larger scale of trigger mechanism,

Fig. 4, is a sectional elevation of a nut and tube, and

Fig. 5, is a plan of the bomb in flight.

The cylindrical casing 1 with its conical front portion 2 and conical rear portion 3, the bulkheads 4 and 5 and the central longitudinal tube 6 constitute the framework of the bomb. Twisted vanes 7 are fixed to the exterior of the rear portion 3, and rotate the casing when projected through the air.

The tube 6 contains a screw 8, a rotation retarding plain or element 11 outside the casing is fixed to the forward end of the screw 8, a portion 12 of which is not screw threaded. A nut 13 on the screw 8 has wings 14 slidable in slots 10 in the tube 6. A spring 15 on the screw 8 is located between the nut 13 and the bulkhead 5, which is provided with detonators 17, adapted to explode a charge 18 of explosives contained in the front portion 2 of the casing. Hammers 19 pivoted near one end to the tube 6 have their inner ends adapted to come into contact with the screw, and their outer ends adapted to strike the detonators 17.

Normally the hammers are prevented from touching the detonators 17 by their inner ends resting against the sides of the screw, as shown in Fig. 2.

Before the bomb is launched into the air, the screw 8 is within the tube 6 as shown in Figs. 1 and 2 and the rotation of the casing caused by the resistance of the air against the vanes 7 rotates the nut also, while the resistance of the air against the rotation retarding element 11 prevents or retards the screw from turning, with the result that the screw 8 is made to travel forward through the nut 13, until the rear end of the screw arrives at the hammers 19, and allows the inner ends of the same to pass free of the said screw as shown in Fig. 3. The screw 8 is prevented from traveling farther forward by its plain end 12 refusing to pass through the nut 13. The screw with the rotation retarding element then protrudes from the front of the casing, and are held from operating the hammers 19 by the spring 15.

When the rotation retarding element strikes the ground or other solid object, the resistance of the spring 15 is overcome, the nut and the screw recede, and the screw strikes the inner ends of the hammers 19, thereby causing outer ends of the said hammers to strike the detonators 17 and explode the charge 18 immediately before the casing 1 can strike the ground or other object.

What I do claim and desire to secure by Letters Patent of the United States is:—

1. The herein described bomb, comprising a casing having external twisted vanes, a nut slidable in the casing and rotatable therewith, a screw threaded through the nut and having a plain end, a rotation retarding element fixed to the end of the screw outside the front of the casing, pivoted hammers operable by the screw, detonators adapted to be struck by the hammers, and an explosive charge adapted to be exploded by the detonators, substantially as set forth.

2. The herein described bomb, comprising a casing having external twisted vanes, a tube fixed centrally of the casing, a nut slidable in slots in the casing and rotatable therewith, a screw threaded through the nut and having a plain end, a rotation retarding element fixed to the end of the screw outside the front of the casing, pivoted hammers operable by the screw, detonators adapted to be struck by the hammers, and an explosive charge adapted to be exploded by the detonators substantially as set forth.

3. The herein described bomb, comprising a casing having external twisted vanes, a nut slidable in the casing and rotatable therewith, a screw threaded through the nut and having a plain end, a rotation retarding element fixed to the end of the screw outside the front of the casing, pivoted hammers normally resting against the side of the screw and adapted to pass behind the end of the same, detonators adapted to be struck by the hammers, and an explosive charge adapted to be exploded by the detonators, substantially as set forth.

4. The herein described bomb, comprising a casing having external twisted vanes, and a bulkhead, a nut slidable in the casing and rotatable therewith, a screw threaded through the nut and having a plain end, a spring between the nut and the bulkhead, a rotation retarding element fixed to the end of the screw outside the front of the casing, pivoted hammers operable by the screw, detonators adapted to be struck by the hammers, and an explosive charge adapted to be exploded by the detonators, substantially as set forth.

5. A bomb of the character described, comprising a casing having means to cause the same to rotate upon its longitudinal axis during its flight, a nut connected with the casing to rotate therewith and adapted to move longitudinally thereof, a screw-threaded rod receiving the nut thereon and having means to prevent said rod from separating from the nut, a rotation retarding element carried by the leading end of the rod, an explosive charge held within the casing, and means rendered active upon the forward movement of the rod for a predetermined distance with relation to the casing and set into action when the rod is moved rearwardly with relation to the casing, for exploding the charge.

6. A bomb of the character described, comprising a casing, a nut connected with the casing to rotate therewith and adapted to move longitudinally with relation thereto, a screw-threaded rod receiving the nut thereon and having means to prevent said rod from separating from the nut, means to effect a relative rotary movement between the casing and rod, an explosive charge held within the casing, and means rendered active upon the forward movement of the rod for a predetermined distance with relation to the casing and set into action when the rod is subsequently moved rearwardly with relation to the casing, for exploding the charge.

7. A bomb of the character described comprising a casing, having spiral vanes to cause the same to rotate upon its longitudinal axis, a nut connected with the casing to rotate therewith and adapted to move longitudinally thereof, yielding means to oppose the longitudinal movement of the nut in one direction with relation to the casing, a screw-threaded rod receiving the nut thereon and having means associated therewith to prevent the separation of the nut and rod, a rotation retarding element connected with the forward end of the rod, a movable hammer having a portion thereof adapted to assume a position in the path of travel of the rear end of the rod when the rod has moved forwardly a predetermined distance with relation to the casing, an explosive charge held within the casing, and a detonator associated with the explosive charge and arranged to be struck by the hammer.

In testimony whereof I have signed my name to this specification in the presence of two witnesses.

DARCY ALBERT HAWKEN.

Witnesses:
L. A. McCONNELL,
ALAN McNEILL.